(12) United States Patent
Maxik et al.

(10) Patent No.: US 12,717,170 B2
(45) Date of Patent: Aug. 25, 2026

(54) EYEWEAR FOR SELECTIVE FILTERING AND ENHANCING OF MELATONIN-SUPPRESSING ELECTROMAGNETIC RADIATION

(71) Applicant: Timeshifter. Inc., Southampton, NY (US)

(72) Inventors: Fredric Maxik, Melbourne, FL (US); Mickey Beyer-Claussen, Southampton, NY (US)

(73) Assignee: Timeshifter, Inc., Southampton, NY (US)

( * ) Notice: Subject to any disclaimer, the term of this patent is extended or adjusted under 35 U.S.C. 154(b) by 739 days.

(21) Appl. No.: 17/663,564

(22) Filed: May 16, 2022

(65) Prior Publication Data

US 2022/0365372 A1 Nov. 17, 2022

Related U.S. Application Data

(60) Provisional application No. 63/201,836, filed on May 14, 2021.

(51) Int. Cl.
*G02C 7/10* (2006.01)
*G02B 5/20* (2006.01)

(52) U.S. Cl.
CPC ................ *G02C 7/104* (2013.01); *G02B 5/20* (2013.01)

(58) Field of Classification Search
CPC .......... G02C 7/104; G02C 7/101; G02C 7/10; G02C 2202/16; G02C 7/108; G02C 7/107; G02C 7/102; G02C 7/02; G02C 7/105; G02C 11/10; G02C 11/00; G02B 5/20; G02B 5/223; G02B 27/0172; G02B 2027/0178; G02B 5/201; G02B 5/22; G02B 27/017; G02B 5/003; G02B 5/26; G02B 6/0055; G02B 6/0031
See application file for complete search history.

(56) References Cited

U.S. PATENT DOCUMENTS

| | | | | |
|---|---|---|---|---|
| 7,369,327 | B1 * | 5/2008 | Nishioka | G03B 17/20 359/720 |
| 2014/0158982 | A1 * | 6/2014 | Park | G02B 6/005 438/27 |
| 2015/0268396 | A1 * | 9/2015 | Weber | G02C 7/104 359/359 |
| 2016/0195736 | A1 * | 7/2016 | Iordanis | G02C 5/008 351/44 |
| 2016/0313573 | A1 * | 10/2016 | Baillet | G02C 7/108 |
| 2017/0261768 | A1 * | 9/2017 | Ambler | G02C 7/104 |

(Continued)

FOREIGN PATENT DOCUMENTS

CN 105291789 A * 2/2016

*Primary Examiner* — William R Alexander
*Assistant Examiner* — Matthew Y Lee
(74) *Attorney, Agent, or Firm* — Daniel C. Pierron; Widerman Malek, PL

(57) ABSTRACT

An eyewear device including a frame and a lens that includes a transmission control region that can at least one of reflect light, absorb light, and convert light from the environment prior to the environmental light being incident on a user. The transmission control region may alter the melatonin suppressing effect of environmental light within a wavelength range from 450 nm to 485 nm, defined as a melatonin suppression wavelength range, passing there-through.

14 Claims, 2 Drawing Sheets

(56) References Cited

U.S. PATENT DOCUMENTS

2017/0315384 A1* 11/2017 Saylor .................... G02C 7/101
2018/0239170 A1* 8/2018 Barrau ................... G02B 5/203
2019/0204624 A1* 7/2019 Barrau ..................... G02B 5/28
2020/0249502 A1* 8/2020 Ballet .................... G02C 7/105
2020/0301226 A1* 9/2020 Yashiro ................... G02F 1/155

* cited by examiner

EYEWEAR FOR SELECTIVE FILTERING AND ENHANCING OF MELATONIN-SUPPRESSING ELECTROMAGNETIC RADIATION

RELATED APPLICATIONS

This application claims priority under 35 U.S.C. § 119(e) of U.S. Provisional Patent Application Ser. No. 63/201,836 filed on May 14, 2021 and titled Eyewear for Selective Filtering and Enhancing of Melatonin-Suppressing Electromagnetic Radiation. The content of this application is incorporated herein by reference.

FIELD OF THE INVENTION

The present invention relates to eyewear for selective enhancement and filtering of melatonin-affecting electromagnetic radiation incident upon the eyes of an individual.

BACKGROUND OF THE INVENTION

The physiological effects of blue light on people, particularly in the production and suppression of production of hormones, such as melatonin and leptin, are well known. However, in order to effectively mitigate undesired physiological effects, those people must take action to either enhance or mitigate the level of blue light incident upon their eyes. This can require that person to carry multiple different devices to change this blue light level, including multiple different types of eyeglasses. Forgetting one or more of these devices can result in suboptimal maintenance of the hormone in the person, having concordant affects on physiological systems of the person, such as their circadian cycle. Accordingly, there is a need in the art for a device that reduces the variety of devices needed for a person to maintain alter the level of light within particular wavelength spectra that the person observes.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to an eyewear device also includes a frame. The device also includes a lens may include a transmission control region, the transmission control region configured to at least one of reflect light, absorb light, and convert light from the environment prior to the environmental light being incident on a user. The device also includes where the transmission control region is configured to alter the melatonin suppressing effect of environmental light within a wavelength range from 450 nm to 485 nm, defined as a melatonin suppression wavelength range, passing therethrough. Other embodiments of this aspect include corresponding computer systems, apparatus, and computer programs recorded on one or more computer storage devices, each configured to perform the actions of the methods.

Implementations may include one or more of the following features. The transmission control region may be configured to at least one of reflect light having a wavelength outside the melatonin suppression wavelength range, absorb light having a wavelength outside the melatonin suppression wavelength range, and convert light having a wavelength below the melatonin suppression wavelength range into light within the melatonin suppression wavelength range by performing a stokes shift. The transmission control region may be configured to at least one of reflect light having a wavelength within the melatonin suppression wavelength range and absorb light having a wavelength within the melatonin suppression wavelength range. The transmission control region may be configured to be switched between a first configuration and a second configuration, the transmission control region is operable to one of reflect and absorb light within the melatonin suppression wavelength range from the environment in the first configuration, and the transmission control region is operable to permit light within the melatonin suppression wavelength range to pass therethrough in the second configuration. The transmission control region may be configured to be positioned in the first configuration in the absence of an electric current and to be switched to and maintained in the second configuration by application of an electric current.

In some embodiments, the wireless communication device may be configured to receive transmissions from a remote computerized device indicating a command to at least one of increase exposure to the melatonin suppression wavelength range and decrease exposure to the melatonin suppression wavelength range; and where the processor is configured to control the operation of the power source to apply a current to effectuate an electric current between the electrodes responsive to the received command. The transmission control region may include a ferromagnetic ink configured to be positioned in the first configuration when a first magnetic field is applied thereto an in the second configuration when a second magnetic field having a pole alignment different from the first magnetic field is applied thereto.

In some embodiments, the eyewear may include conversion material positioned in optical communication with each of the environmental light and the lens and configured to absorb environmental light below the melatonin suppression wavelength range incident thereupon and emit light inside the melatonin suppression wavelength range. The conversion material may be positioned on an upper portion of the lens. The conversion material may be converted to emit light having a peak wavelength intensity within a range from 465 nm to 480 nm. The conversion material may include at least one of a phosphor material, a quantum dot material, and a photosensitive dye.

In some embodiments, the transmission control region may be configured to be switched between a first configuration where light within the melatonin suppression range from the environmental light passes therethrough and light emitted from the conversion material is one of reflected towards a user, refracted towards the user, and permitted to pass therethrough towards the user, and a second configuration where light within the melatonin suppression wavelength range is at least one of reflected and absorbed by the transmission control region, by application of an electrical current. The eyewear may include electrodes electrically coupled to the transmission control region and configured to enable an electrical current to flow through the transmission control region, and a control system electrically coupled to the electrode. The control system may include a processor, a memory device operatively coupled to the processor, a wireless communication device operatively coupled to the processor, and a power source electrically coupled to the processor, the memory device, the wireless communication device, and the electrodes. The wireless communication device may be configured to receive transmissions from a remote computerized device indicating a command to at least one of increase exposure to the melatonin suppression wavelength range and decrease exposure to the melatonin suppression wavelength range. The processor may be configured to control the operation of the power source to apply a current to effectuate an electric current between the electrodes responsive to the received command.

In some embodiments, the eyewear may include a conversion material filter configured to be transitioned between first and second configurations, with the first configuration operable to at least one of reflect and absorb light within the melatonin suppression wavelength range and the second configuration configured to permit light within the melatonin suppression wavelength range to pass therethrough. The conversion material filter may be configured to be switched between the first and second configurations by application of an electrical current. Accordingly, the eyewear may include electrodes electrically coupled to the conversion material filter and configured to enable an electrical current to flow through the conversion material and a control system that may include a processor, a memory device operatively coupled to the processor, a wireless communication device operatively coupled to the processor, and a power source electrically coupled to the processor, the memory device, the wireless communication device, and the electrodes. The wireless communication device may be configured to receive transmissions from a remote computerized device indicating a command to at least one of increase exposure to the melatonin suppression wavelength range and decrease exposure to the melatonin suppression wavelength range The processor may be configured to control the operation of the power source to apply a current to effectuate an electric current between the electrodes responsive to the received command. Implementations of the described techniques may include hardware, a method or process, or computer software on a computer-accessible medium.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as “above,” “below,” “upper,” “lower,” and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as “generally,” “substantially,” “mostly,” and other terms are used, in general, to mean that the referred to object, characteristic, or quality constitutes a majority of the subject of the reference. The meaning of any of these terms is dependent upon the context within which it is used, and the meaning may be expressly modified.

Figure 1:
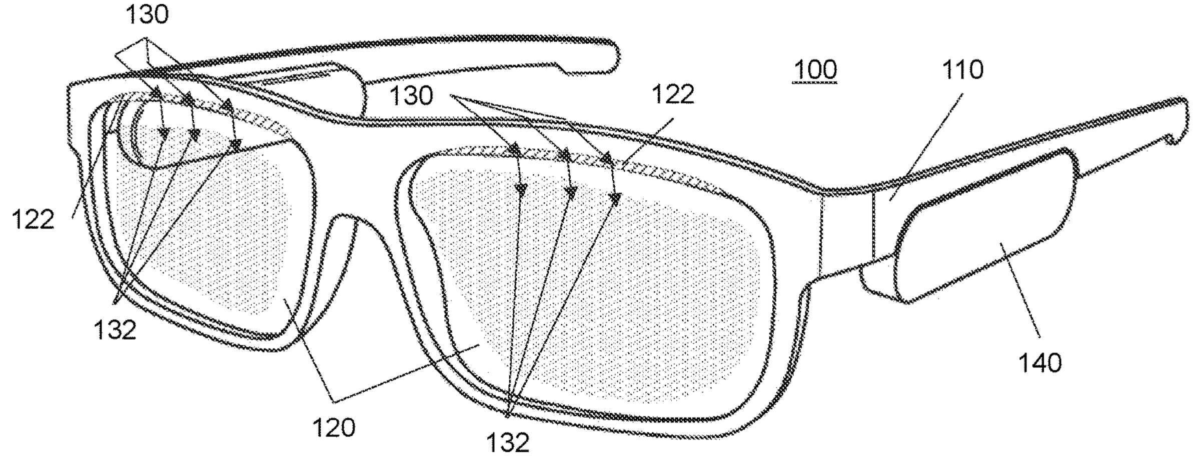
FIG. 1 is a perspective view of eyewear according to an embodiment of the invention.

An embodiment of the invention, as shown and described by the various figures and accompanying text, provides a device, in some embodiments in the form of eyeglasses, configured to facilitate circadian shifting by either enhancing or decreasing blue light incident upon a user’s eyes. Referring now to FIG. 1, eyewear 100 according to an embodiment of the invention is presented. The eyewear 100 may comprise a frame 110 and one or more lenses 120. The frame 110 may be configured to be worn by an individual such that the lenses 120 are positioned generally adjacent to and in front of the eyes of the individual.

The lenses 120 may comprise one or more conversion materials 122. The conversion materials 122 may be a material that absorbs photons from the environment at a first wavelength, namely an environmental wavelength, and emits photons at a second wavelength, namely a converted wavelength, that is different from the environmental wavelength. Types of materials that perform this wavelength shift include, but are not limited to, phosphors, quantum dots, photosensitive dyes, and the like. It is contemplated and included within the scope of the invention that any conversion material may be used in the eyewear. In some embodiments, the conversion materials 122 may be positioned along a top or upper portion of the lens. Such positioning may be advantageous to receiving environmental light, particularly sunlight, that tends to be incident on the lens 120 from a generally upward direction.

As shown in FIG. 1, environmental light 130 may be incident upon the conversion materials 122. The environmental light 130 may comprise electromagnetic radiation within a wavelength range that includes the environmental wavelength that the conversion material 122 may be operable to convert. In some embodiments, the conversion material 122 may be configured to perform a Stokes shift and effectively increase the wavelength of the environmental wavelength, emitting electromagnetic radiation 132 at a converted wavelength that is greater than the wavelength than the environmental wavelength. In some embodiments, the conversion material 122 may be configured to perform an anti-Stokes shift and effectively decrease the wavelength of the environmental wavelength, emitting electromagnetic radiation at a converted wavelength that is less than the wavelength of the environmental wavelength.

In order to increase the affect the environmental light has on the circadian rhythm of the individual wearing the eyewear 100, the conversion material 122 may be configured to emit light within a wavelength range that suppresses the natural production of melatonin when incident upon the eyes or skin of the individual. Such a wavelength range includes the range from 450 nanometers (nm) to 500 nm, light that is generally perceived as blue light, this range defining a converted wavelength range. Further embodiments may be configured to emit radiation within a converted wavelength range from 465 nm to 490 nm, and/or having a peak wavelength intensity/being centered from 465 nm to 480 nm. Accordingly, the conversion material 122 may comprise material operable to convert electromagnetic radiation comprised by environmental light outside this range into radiation within this range. In some embodiments, the conversion material 122 may comprise multiple materials, with one material configured to perform a Stokes shift on electromagnetic radiation having a wavelength that is below the converted wavelength range, i.e. below 450 nanometers, including light in the violet and ultraviolet wavelength range, and another material configured to perform an anti-Stokes shift on electromagnetic radiation having a wavelength that is above the converted wavelength range, i.e. above 485 nm. Such embodiments may facilitate thermal management, with the heat generation of Stokes shifts being offset by the cooling effect of performing an anti-Stokes shift. Indeed, the thermal energy produced from the material performing the Stokes shift may be conducted to the material performing the anti-Stokes shift to replenish the necessary thermal energy in the crystal lattice of the material performing the anti-Stokes shift, where applicable.

The conversion material 122 may emit the electromagnetic radiation 132 within the converted wavelength range into the lens 120. In some embodiments, an additive transmission medium may be applied between the conversion material 122 and the lens 120, including, but not limited to, oils, gels, light tubes, and any other substance or structure that may facilitate transmission of radiation therebetween. The lens 120 may be configured to cause the emitted radiation 132 to propagate out of the lens 120 in the direction of the individual wearing the eyewear 100 and not away from the individual. In some embodiments, the lens 120 may comprise a transmission control region 124. The transmission control region 124 may be a portion of or the entirety of the lens 120 and may be configured to control the direction of transmission of electromagnetic radiation within and out of the lens 120. In some embodiments, the transmission control region 124 may be configured to prevent the emitted radiation 132 from transmitting through the lens 122 and outward therefrom away from the individual.

Figure 2:
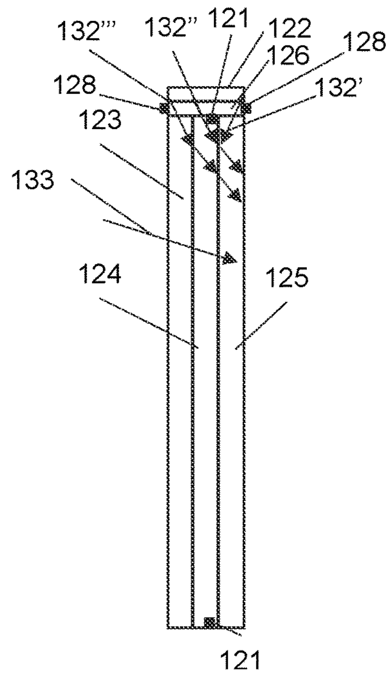
FIG. 2 is a schematic view of a lens of eyewear according to an embodiment of the invention.

Referring now to FIG. 2, the transmission control region 124 is shown positioned between an outer portion 123 of the lens 120 and an inner portion 125 of the lens 120. In some embodiments, the transmission control region 124 may be configured to reflect emitted radiation 132' that is propagating through the lens 120 in the direction of the outer portion 123 and that would otherwise exit the lens 120 away from the individual. The emitted radiation 132' may be reflected back into the inner portion 123 in the direction of the individual. In some embodiments, the transmission control region may be configured to selectively reflect radiation within the converted wavelength range while permitting radiation outside that range to pass therethrough. The transmission control region 124 may further be configured to refract light emitted from the conversion material 122 into the transmission control region 124 at the point the emitted radiation 132" enters the transmission control region 124 to avoid distortion of environmental light entering the lens 120 so that the individual wearing the eyewear 100 has difficulty seeing. The transmission control region 124 may further be configured to permit light within the converted wavelength range to propagate therethrough, such that light within the converted wavelength range may enter at the outer portion 123, either as emitted light 132''' or from the environment 133, pass through the transmission control region 124 and the inner portion 125, and be incident upon the individual.

In some embodiments, the transmission control region 124 may be passive, always performing the above-described behavior of selectively reflecting emitted radiation 132 towards the individual. In some embodiments, the transmission control region 124 may be active and selectively controllable to reflect emitted radiation 132 as described in a first condition and have a different transmission profile in a second condition. For example, in the second condition, the transmission control region 124 may be configured to either absorb light within the converted wavelength range or otherwise prevent or inhibit the transmission of light within the converted wavelength range in the direction of the individual, thereby reflecting or absorbing environmental light 133 and emitted radiation 132", 132''' within the converted wavelength range away from the individual and permitting emitted radiation 132' to pass therethrough towards the outer portion 123 and away from the individual. In another embodiment, in the second condition, the transmission control region may absorb most or all light within the converted wavelength range. The transmission control region 124 may be any type of structure or device that enables such functionality. For example, the transmission control region 124 may be a polymer dispersed liquid crystal (PDLC) that may be opaque to radiation within the converted wavelength range when an electrical current is applied and transparent and/or have a significantly increased transmittance when a current is not applied. Accordingly, the transmission control region 124 may comprise electrodes 121 configured to permit a current to be applied therethrough. As another example, the transmission control region may comprise a ferromagnetic ink configured to be positioned in the first configuration when a magnetic field having a first pole alignment is applied thereto and in the second configuration when a magnetic field having a second pole alignment that is different from the first pole alignment is applied thereto. In such embodiments, one or both of the electrodes 121 may be connected to an electromagnetic device operable to generate magnetic fields having the first and second pole alignments but running current therethrough in opposite directions. The magnetic fields generated by the electromagnet may flow through the transmission control region 124 and shift the ferromagnetic inks comprised thereby between the first and second configurations. In some embodiments, the transmission control region 124 may comprise a transparent organic light-emitting diode (OLED) material. In some embodiments, the electrodes 121 may be formed of transparent material and may be generally transparent.

In some embodiments, the lens 120 may comprise a conversion material filter 126. The conversion material filter 126 may be operable to selectively block emitted radiation 132 from entering the lens 120 and being incident upon the individual. The conversion material filter 126 may be any device operable to selectively filter emitted radiation 132 in a first condition and permit emitted radiation 132 to pass therethrough in a second condition. For example, the conversion material filter 126 may be a PDLC that may be opaque when an electrical current is applied and transparent and/or have a significantly increased transmittance when a current is not applied. Accordingly, the conversion material filter 126 may comprise electrodes 128 configured to permit a current to be applied therethrough. The conversion material filter 126 may be configured to be opaque to a wavelength range including the wavelength of the emitted radiation 126, i.e. the converted wavelength range, or substantially greater, including, either individually or collectively, the visible spectrum, wavelengths within the UV spectrum, and wavelengths within the IR spectrum.

It is contemplated and included within the scope of the invention that the eyewear 100 may be corrective eyewear, addressing vision problems for which eye glasses are typically worn, including, but not limited to, astigmatism, myopia, hypermetropia, presbyopia, and the like. Accordingly, in some embodiments, at least one or both of the outer portion 123 and the inner portion 125 may be refractory. Furthermore, the transmission control region 124 may be configured to avoid interfering with refraction of either of the outer or inner portions 123, 125.

In some embodiments, the eyewear 100 may comprise the transmission control region 124 and not comprise the conversion material 122. In some embodiments the eyewear 100 may comprise the conversion material 122 and not comprise the transmission control region 124. In embodiments where the eyewear 100 comprises only the transmission control region 124, the transmission control region 124 may be passive and configured to one of reflect, absorb, and/or convert environmental light incident thereupon within the converted wavelength range, thereby reducing the melatonin-suppressing effects of environmental light. In alternative embodiments, the transmission control region 124 may be configured to convert environmental light within a wavelength range outside the converted wavelength range to light within the converted wavelength range, thereby increasing the melatonin suppressing effects of environmental light. In some embodiments, the transmission control region may be active and switchable between two configurations by application of an electric current as described above, in a first configuration permitting environmental light within the converted wavelength range to pass therethrough and in a second configuration to one of reflect and absorb environmental light within the converted wavelength range.

While the eyewear 100 is disclosed as being configured to alter the incidence of light within a particular wavelength range that is known to be biologically effective for the particular hormone melatonin, it is contemplated and included within the scope of the invention that the structure of the eyewear 100 may be used in a device that is configured to alter the incidence of environmental light within a wavelength range known to be effective for any other hormone of the human body that is known to be modified by external light exposure, including, but not limited to, leptin. Such embodiments may have target wavelength ranges akin to the melatonin suppressing wavelength range, but instead is within a range related to the target hormone.

Figure 3:
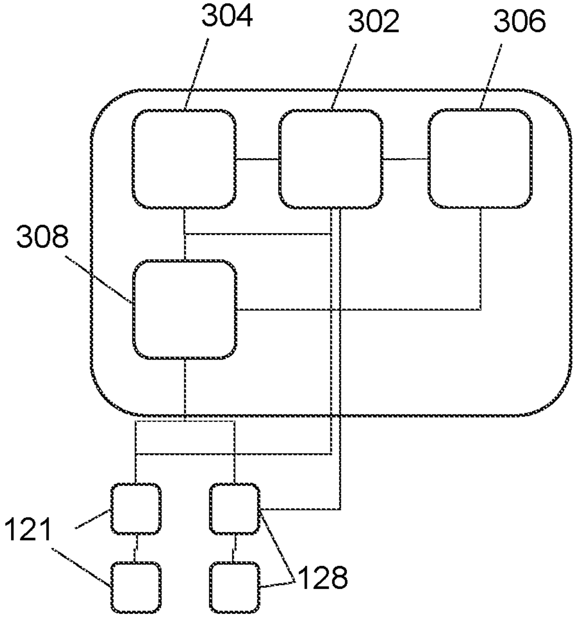
FIG. 3 is a schematic view of a control system according to an embodiment of the invention.

As shown in FIG. 1, the eyewear 100 may comprise a control system 140. The control system 140 may be connected to the electrodes 121, 128 of the transmission control region 124 and the conversion material filter 126 so as to independently control the operation thereof. The control system 140 may be carried on the frame 102 of the eyewear 100, facilitating physical connection to the electrodes 121, 128. Referring now to FIG. 3, a schematic view of a control system 300 according to an embodiment of the invention is presented. The control system 300 may comprise a processor 302, a memory device 304, a wireless communication device 306, and a power source 308. The processor 302 may be any type of processing device as is known in the art, including, but not limited to, microprocessors, integrated circuits (IC), field-programmable gate arrays (FPGAs), and the like. The memory device 304 may be operatively coupled to the processor 302 and may be any device operable to store data non-transitively thereon, including, but not limited to, hard disk drives, solid-state drives, flash drives, secure digital (SD) cards, PROM, EPROM, EEPROM, and any other non-volatile memory device. The wireless communication device 306 may be any device capable of wireless communication utilizing wireless transmission standards as are known in the art, including, but not limited to, 802. xx standards, such as WiFi, Bluetooth, Zigbee, and Z-wave, LiFi, cellular communication including CDMA, TDMA, 3G, 4G, and 5G standards, and the like. Moreover, the wireless communication device 306 may be operable to communicate across a network, including Personal Area Networks (PANs), Local Area Networks (LANs), Wide Area Networks (WANs) such as the Internet, as well as communicate directly with other computerized devices. The wireless communication device 306 may be positioned in communication with the processor 302 and operable to transmit and receive commands to and from the processor 302. The power source 308 may be connected to and configured to provide power to each of the processor 302, the memory device 304, and the wireless communication device 306. The power source 308 may be any device capable of delivering such power, including, but not limited to, batteries, capacitors, including super capacitors, and the like. Moreover, the power source 308 may include charging and voltage-changing and regulating circuitry as is necessary to provide electricity of varying voltages to the various components of the eyewear and to facilitate recharging of the power source 308, including charging by physical connection and by wireless charging, such as induction charging.

The processor 302 may be configured to execute software stored on the memory device 304 that enables control of the transmission control region 124 and the conversion material filter 126 as described above, namely, changing the respective structures between first and second conditions that changes the transmission and reflection characteristics thereof. Specifically, the processor 302 may be operatively coupled to the electrodes 121, 128 and/or the power source 308, and any other necessary control circuitry, such as relays, to control the flow of current to electrodes 121, 128 to selectively control the changing between the first and second conditions of the transmission control region 124 and the conversion material filter 126.

As mentioned above, the wireless communication device 306 may be configured to communicate wirelessly with a remote computerized device. An example of such communication is provided in U.S. patent application Ser. No. 16/432,544 titled Method and System for Generating and Providing Notifications for a Circadian Shift Protocol, the content of which is incorporated herein by reference. In the '544 application, a circadian shift protocol is determined to effectuate a change in the circadian rhythm of a user. Part of the protocol includes seeking exposure to and avoiding exposure to blue light at different times of day, with indications to seek or avoid blue light being provided to the user.

In the present embodiment, a remote computerized device may transmit a command to the processor 302 via the wireless communication device 306 to operate one or both of the transmission control region 124 and the conversion material filter 126 to selectively increase or decrease the exposure of the individual to light within the converted wavelength range. Specifically, when a command to increase exposure is received, the processor 302 may operate the transmission control region 124 in its first configuration to reflect and otherwise permit light within the converted wavelength range to be incident upon the user and operate the conversion material filter 126 in its second condition to permit emitted radiation 132 from the conversion material 122 to pass therethrough so as to be incident upon the individual. Conversely, when a command to decrease exposure is received, the processor 302 may operate the transmission control region 124 in its second condition to reduce light within the converted wavelength range from being incident upon the individual and operate the conversion material filter 126 in its first condition to prevent the transmission of emitted radiation 132 therethrough. In some embodiments, a plurality of commands may be received and stored in the memory device 304 for subsequent performance. For example, when a protocol is developed as indicated in the '544 application, all elements of that protocol related to seeking out and avoiding blue light may be transmitted to the wireless communication device 306 and stored in the memory device 304, and the processor 302 may access and execute those commands in accordance with the time to seek our or avoid blue light as indicated by the protocol, selectively increasing or decreasing the amount of light containing the converted wavelength range the individual experiences through control of the conditions of the transmission control region 124 and the conversion material filter 126.

References are made above the to the converted wavelength range. It is contemplated that that wavelength range may also be referred to as a melatonin suppression wavelength range, with light within that wavelength range having the effect of suppressing melatonin production in an individual upon which the light is incident.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An eyewear device comprising:

a frame;

a lens comprising an inner portion, an outer portion, and a transmission control region, the transmission control region configured to convert at least portion of light having a wavelength below a melatonin suppression wavelength range from 450 nm to 485 nm into light within the melatonin suppression wavelength range by performing a Stokes shift, from the environment prior to the environmental light being incident on a user; and, wherein the transmission control region is configured to be switched between a first configuration and a second configuration, wherein the transmission control region is operable to convert the at least a portion of light having a wavelength below the melatonin suppression wavelength range into light within the melatonin suppression wavelength range in the first configuration, and wherein the transmission control region is operable to permit light within the melatonin suppression wavelength range to pass therethrough in the second configuration without converting the at least a portion of light having a wavelength below the melatonin suppression wavelength range;

a plurality of first electrodes electrically coupled to the transmission control region and configured to enable a first electrical current to flow through the transmission control region;

wherein the inner portion of the lens overlays a rearward face of the transmission control region, and the outer portion of the lens overlays a frontward face of the transmission control region; and wherein at least one of the plurality of first electrodes is positioned on an upper portion of the transmission control region and at least another one of the plurality of first electrodes is positioned on a lower portion of the transmission control region.

2. The eyewear of claim 1 wherein the transmission control region is configured to be positioned in the first configuration in the absence of the first electrical current and to be switched to and maintained in the second configuration by application of the first electric current.

3. The eyewear of claim 2 further comprising a control system electrically coupled to the plurality of first electrodes and comprising:

a processor;

a memory device operatively coupled to the processor;

a wireless communication device operatively coupled to the processor; and a power source electrically coupled to the processor, the memory device, the wireless communication device, and the plurality of first electrodes;

wherein the wireless communication device is configured to receive transmissions from a remote computerized device indicating a command to at least one of increase exposure to the melatonin suppression wavelength range and decrease exposure to the melatonin suppression wavelength range; and wherein the processor is configured to control the operation of the power source to apply a current to effectuate the first electrical current between the at least one first electrode on the upper portion of the transmission control region and the at least one other first electrode on the lower portion of the transmission control region responsive to the received command.

4. The eyewear of claim 1 further comprising conversion material positioned in optical communication with each of the environmental light and the lens and configured to absorb environmental light below the melatonin suppression wavelength range that is incident thereupon and emit light inside the melatonin suppression wavelength range.

5. The eyewear of claim 4 wherein the conversion material is positioned on and overlays at least a portion of an upper portion of the inner portion of the lens, an upper portion of the outer portion of the lens, the upper portion of the transmission control region, and the at least one first electrode of the plurality of first electrodes that is positioned on the upper portion of the transmission control region.

6. The eyewear of claim 4 wherein the conversion material is converted to emit light having a peak wavelength intensity within a range from 465 nm to 480 nm.

7. The eyewear of claim 4, wherein the conversion material comprises at least one of a phosphor material, a quantum dot material, and a photosensitive dye.

8. The eyewear of claim 4 wherein the transmission control region is configured to be switched between a first configuration where light within the melatonin suppression range from the environmental light passes therethrough and light emitted from the conversion material is one of reflected towards a user, refracted towards the user, and permitted to pass therethrough towards the user, and a second configuration where light within the melatonin suppression wavelength range is at least one of reflected and absorbed by the transmission control region, by application of the first electrical current, the eyewear further comprising:

a control system electrically coupled to the plurality of first electrodes and comprising:

a processor;

a memory device operatively coupled to the processor;

a wireless communication device operatively coupled to the processor; and a power source electrically coupled to the processor, the memory device, the wireless communication device, and the plurality of first electrodes;

wherein the wireless communication device is configured to receive transmissions from a remote computerized device indicating a command to at least one of increase exposure to the melatonin suppression wavelength range and decrease exposure to the melatonin suppression wavelength range; and wherein the processor is configured to control the operation of the power source to apply a current to effectuate the first electrical current between the at least one first electrode on the upper portion of the transmission control region and the at least one other first electrode on the lower portion of the transmission control region responsive to the received command.

9. The eyewear of claim 4 further comprising a conversion material filter configured to be transitioned between first and second configurations, with the first configuration operable to at least one of reflect and absorb light within the melatonin suppression wavelength range and the second configuration configured to permit light within the melatonin suppression wavelength range to pass therethrough.

10. The eyewear of claim 9 wherein the conversion material filter is configured to be switched between the first and second configurations by application of an electrical current, the eyewear further comprising:

a plurality of second electrodes electrically coupled to the conversion material filter and configured to enable a second electrical current to flow through the conversion material; and a control system comprising:

a processor;

a memory device operatively coupled to the processor;

a wireless communication device operatively coupled to the processor; and a power source electrically coupled to the processor, the memory device, the wireless communication device, and the plurality of second electrodes;

wherein the wireless communication device is configured to receive transmissions from a remote computerized device indicating a command to at least one of increase exposure to the melatonin suppression wavelength range and decrease exposure to the melatonin suppression wavelength range; and wherein the processor is configured to control the operation of the power source to apply a current to effectuate the second electrical current between the plurality of second electrodes responsive to the received command.

11. An eyewear device comprising:

a frame;

a lens comprising an inner portion, an outer portion, and a transmission control region, the transmission control region configured to convert at least a portion of light having a wavelength below a melatonin suppression wavelength range from 450 nm to 485 nm into light within the melatonin suppression wavelength range by performing a Stokes shift, from the environment prior to the environmental light being incident on a user, wherein the transmission control region is configured to be switched between a first configuration and a second configuration, wherein the transmission control region is operable to convert the at least a portion of light having a wavelength below the melatonin suppression wavelength range into light within the melatonin suppression wavelength range in the first configuration, and wherein the transmission control region is operable to permit light within the melatonin suppression wavelength range to pass therethrough in the second configuration without converting the at least a portion of light having a wavelength below the melatonin suppression wavelength range;

conversion material positioned in optical communication with each of the environmental light and the lens and configured to absorb environmental light incident thereupon;

a plurality of electrodes electrically coupled to the transmission control region and configured to enable an electrical current to flow through the transmission control region;

wherein the inner portion of the lens overlays a rearward face of the transmission control region, and the outer portion of the lens overlays a frontward face of the transmission control region; and wherein at least one of the plurality of electrodes is positioned on an upper portion of the transmission control region and at least another one of the plurality of electrodes is positioned on a lower portion of the transmission control region.

12. The eyewear of claim 11 wherein the conversion material comprises at least one of a phosphor material, a quantum dot material, and a photosensitive dye.

13. The eyewear of claim 11 further comprising:

a control system electrically coupled to the electrodes and comprising:

a processor;

a memory device operatively coupled to the processor;

a wireless communication device operatively coupled to the processor; and a power source electrically coupled to the processor, the memory device, the wireless communication device, and the plurality of electrodes;

wherein the transmission control region is configured to be positioned in the first configuration in the absence of the electrical current and to be switched to and maintained in the second configuration by application of the electrical current;

wherein the wireless communication device is configured to receive transmissions from a remote computerized device indicating a command to at least one of increase exposure to the melatonin suppression wavelength range and decrease exposure to the melatonin suppression wavelength range; and wherein the processor is configured to control the operation of the power source to apply a current to effectuate the electrical current between the at least one electrode on the upper portion of the transmission control region and the at least one other electrode on the lower portion of the transmission control region responsive to the received command.

14. An eyewear device comprising:

a frame;

a lens comprising an inner portion, an outer portion, and a transmission control region, the transmission control region configured to:

be switched between a first configuration and a second configuration; and convert at least a portion of light having a wavelength below a melatonin suppression wavelength range from 450 nm to 485 nm into light within the melatonin suppression wavelength range by performing a Stokes shift in the first configuration; and permit light within the melatonin suppression wavelength range to pass therethrough in the second configuration without converting the at least a portion of light having a wavelength below the melatonin suppression wavelength range;

conversion material positioned in optical communication with each of the environmental light and the lens and configured to absorb environmental light below the melatonin suppression wavelength range that is incident thereupon and emit light inside the melatonin suppression wavelength range;

a plurality of electrodes electrically coupled to the transmission control region and configured to enable an electrical current to flow through the transmission control region; and a control system electrically coupled to the electrodes and comprising:

a processor;

a memory device operatively coupled to the processor;

a wireless communication device operatively coupled to the processor; and a power source electrically coupled to the processor, the memory device, the wireless communication device, and the plurality of electrodes;

wherein the inner portion of the lens overlays a rearward face of the transmission control region, and the outer portion of the lens overlays a frontward face of the transmission control region;

wherein at least one of the plurality of electrodes is positioned on an upper portion of the transmission control region and at least another one of the plurality of electrodes is positioned on a lower portion of the transmission control region;

wherein the transmission control region is configured to be positioned in a first configuration in the absence of the electrical current and to be switched to and maintained in a second configuration by application of the electrical current;

wherein the wireless communication device is configured to receive transmissions from a remote computerized device indicating a command to at least one of increase exposure to the melatonin suppression wavelength range and decrease exposure to the melatonin suppression wavelength range; and wherein the processor is configured to control the operation of the power source to apply a current to effectuate the electrical current between the at least one electrode on the upper portion of the transmission control region and the at least one other first electrode on the lower portion of the transmission control region responsive to the received command.

* * * * *